United States Patent
Yun

(10) Patent No.: US 7,370,552 B2
(45) Date of Patent: May 13, 2008

(54) MECHANISM FOR CONTROLLING TOE ANGLE OF VEHICLE WHEELS

(75) Inventor: Seok-Chan Yun, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 748 days.

(21) Appl. No.: 10/973,388

(22) Filed: Oct. 27, 2004

(65) Prior Publication Data
US 2005/0204845 A1    Sep. 22, 2005

(30) Foreign Application Priority Data
Mar. 18, 2004    (KR) .................. 10-2004-0018351

(51) Int. Cl.
*G05G 11/00* (2006.01)
(52) U.S. Cl. .................. 74/484 R; 74/425; 180/411; 280/124.134; 280/124.133
(58) Field of Classification Search .......... 74/484 R, 74/424, 492, 493; 180/444, 411; 280/124.134, 280/124.133
See application file for complete search history.

(56) References Cited

U.S. PATENT DOCUMENTS

| 5,249,638 | A * | 10/1993 | Watanabe et al. .......... 180/404 |
| 5,251,135 | A * | 10/1993 | Serizawa et al. ............ 701/42 |
| 6,827,176 | B2 * | 12/2004 | Bean et al. ................. 180/411 |
| 7,004,281 | B2 * | 2/2006 | Hidaka ...................... 180/446 |
| 7,163,079 | B2 * | 1/2007 | Turner et al. ............... 180/444 |
| 2005/0217906 | A1 * | 10/2005 | Spark ......................... 180/22 |
| 2006/0131097 | A1 * | 6/2006 | Lim et al. ................... 180/411 |
| 2007/0029748 | A1 * | 2/2007 | Baxter et al. ......... 280/86.758 |

FOREIGN PATENT DOCUMENTS

| KR | 1998-31406 | 7/1998 |
| KR | 1999-12802 | 2/1999 |

OTHER PUBLICATIONS

English Language Abstract of KR 1998-31406.
English Language Abstract of KR 1999-12802.

* cited by examiner

*Primary Examiner*—David M. Fenstermacher
(74) *Attorney, Agent, or Firm*—Greenblum & Bernstein, P.L.C.

(57) ABSTRACT

A power transfer system is constituted under a simple construction (a worm gear, transfer rod integrally installed with a worm sector gear, and lower control arm), thereby improving the efficiency of the power transfer of the toe-angle controlling mechanism for vehicle wheels. The worm gear and worm sector gear are closed in a cover part of a housing, acquiring the durability and reliability of the toe-angle controlling mechanism for the vehicle wheels. The toe angle is prevented from being varied according to the exterior force transmitted from the vehicle wheel, by a unique characteristic (no inverse-transfer power) of the worm gear and worm sector gear, thus improving the vehicle stability.

8 Claims, 2 Drawing Sheets

MECHANISM FOR CONTROLLING TOE ANGLE OF VEHICLE WHEELS

CROSS-REFERENCE TO RELATED APPLICATIONS

The present application is based on, and claims priority from, Korean Application Serial Number 10-2004-0018351, filed on Mar. 18, 2004, the disclosure of which is hereby incorporated by reference herein in its entirety.

FIELD OF THE INVENTION

The present invention relates in general to a toe angle controlling mechanism. More particularly, the present invention relates to a mechanism that actively adjusts the toe angle of vehicle wheels according to the vehicle operation state.

BACKGROUND OF THE INVENTION

The toe angle of the vehicle wheel typically affects the stability of the vehicle driving. Therefore, a properly aligned toe angle stabilizes the forward driving of the vehicle and precludes an oversteering or excessive understeering during the turning of the vehicle to thereby balance the steering.

Accordingly, if the toe angle of the vehicle wheels is adjusted actively during the vehicle operation, the vehicle stability can be greatly improved.

SUMMARY OF THE INVENTION

Embodiments of the present invention can actively control the toe angle of the vehicle wheel according to the vehicle operation state via a power transfer mechanism having a simple construction and high efficiency, thereby greatly improving the vehicle stability.

A toe angle controlling mechanism for vehicle wheels includes a lower control arm pivotably connected at one end thereof to a carrier supporting a vehicle wheel. A transfer rod is formed with pivot arms pivotably connected to the other end of the lower control arm. A worm sector gear is integrally installed on the transfer rod. A worm gear meshes with the worm sector gear. A motor provides a rotational force to the worm gear. A housing is fixed at one end thereof to the motor and encloses the worm gear and worm sector gear therein. A controller controls the motor by receiving signals of the vehicle speed and steering angle.

BRIEF DESCRIPTION OF THE DRAWINGS

For a better understanding of the nature and objects of the present invention, reference should be made to the following detailed description taken in conjunction with the accompanying drawings, in which.

DETAILED DESCRIPTION OF THE PREFERRED EMBODIMENTS

Figure 1:
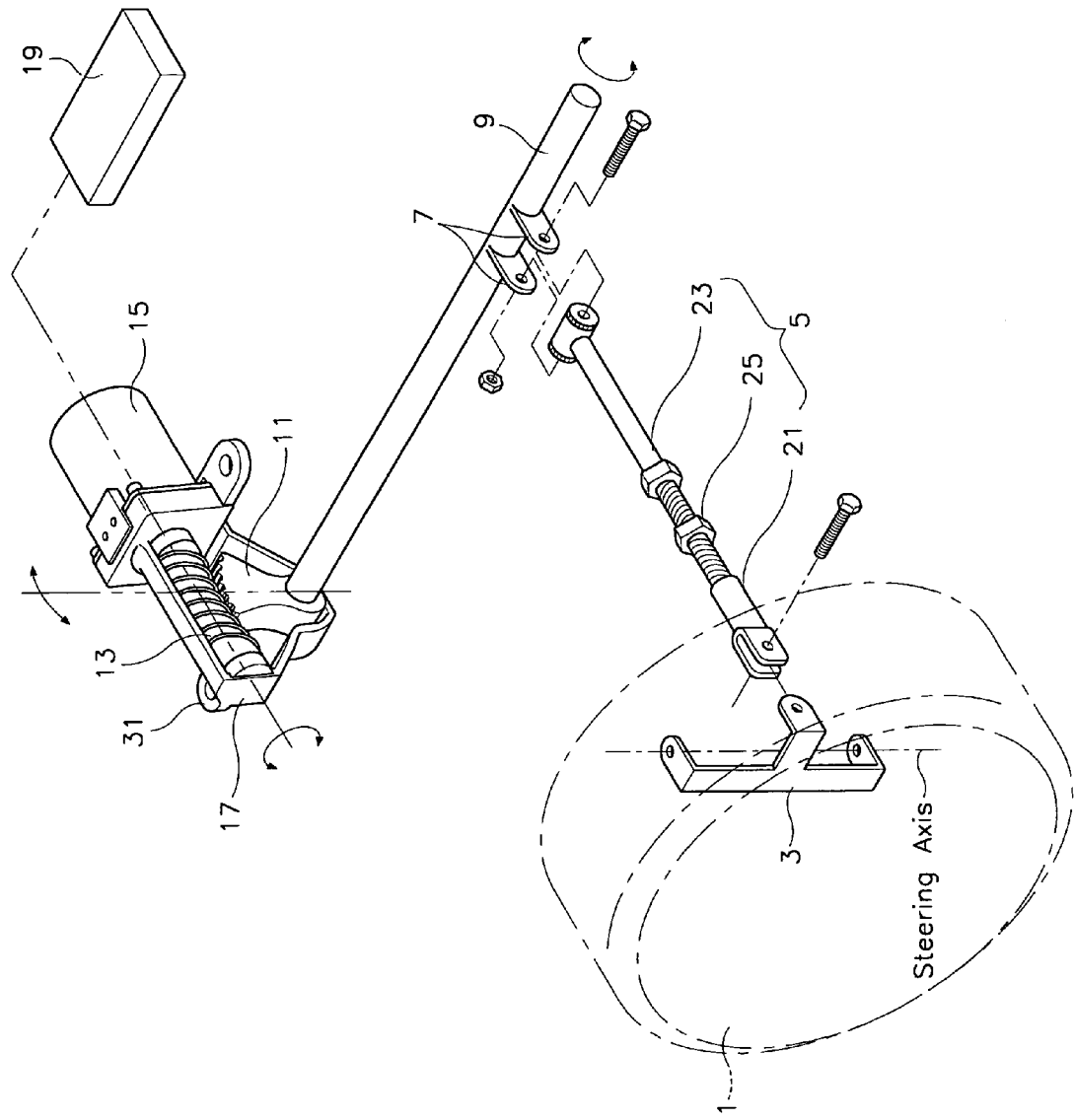
FIG. 1 illustrates a mechanism for controlling the toe angle of vehicle wheels according to an embodiment of the present invention.
Figure 2:
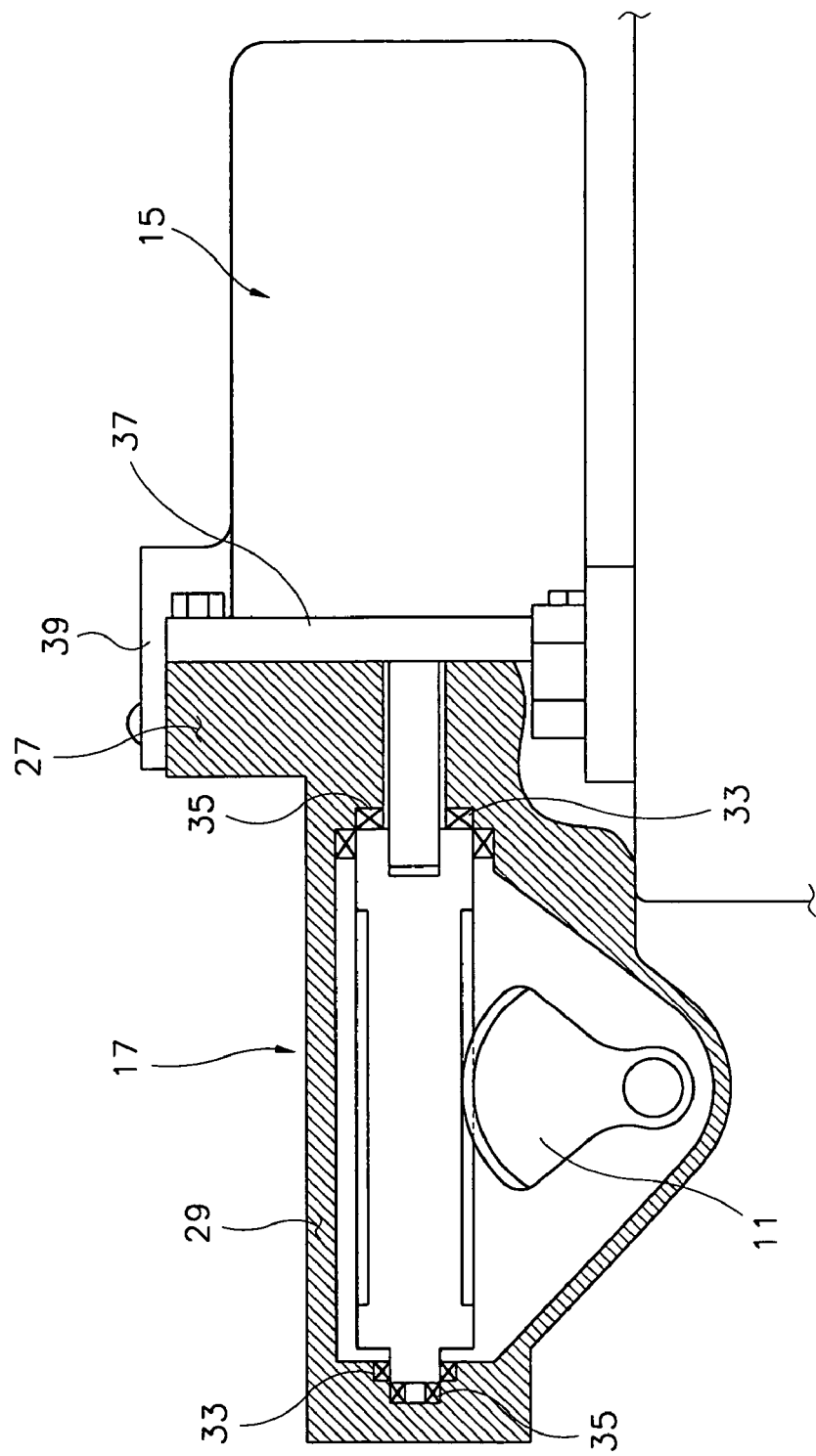
FIG. 2 illustrates the inside construction of a housing.

Referring now to FIGS. 1 and 2, a lower control arm 5 is pivotably connected at one end thereof to a carrier 3 supporting a vehicle wheel 1. A transfer rod 9 is formed with pivot arms 7 pivotably connected to the other end of the lower control arm 5. A worm sector gear 11 is integrally installed on the transfer rod 9. A worm gear 13 meshes with the worm sector gear 11. A motor 15 provides a rotational force to the worm gear 13. A housing 17 is fixed at one end thereof to the motor 15 and encloses the worm gear 13 and worm sector gear 11 therein. A controller 19 controls the motor 15 by receiving signals of the vehicle speed and steering angle.

The lower control arm 5 is lengthily installed in the widthwise direction of the vehicle. One end of the lower control arm 5 is eccentrically connected to the carrier 3 in relation to the steering axis of the carrier 3. Thus, when the lower control arm 5 linearly moves in the widthwise direction of the vehicle, the carrier 3 pivots about the steering axis of the carrier 3, thereby adjusting the toe angle of the vehicle wheels.

The lower control arm 5 includes an arm end 21, arm rod 23, and locknut 25. The arm end 21 is connected to the carrier 3 and is formed with a male screw. The arm rod 23 is formed with a female screw that is coupled to the arm end 21. The locknut 25 fastens with the male screw of the arm end 21.

The length of the lower control arm 5 can be adjusted by changing the coupled length of the arm rod 23 and arm end 21 and then locking the adjusted state of the arm rod 23 and arm end 21 via the locknut 25.

The housing 17 includes a coupling block part 27 having a vertical surface in relation to the rotational axis of the motor 15. The coupling block part 27 is penetrated by the rotational axis of the motor 15. A cover part 29 integrally extends from the coupling block part 27 and stably supports the meshed state of the worm gear 13 and worm sector gear 11 therein.

The worm sector gear 11 is shaped like an arch or arc, and the inner side of the cover part 29 is formed with a space having a cross-section of an inverse-triangular shape configuration, thus allowing the worm sector gear 11 to shift within a certain range.

The cover part 29 integrally protrudes out at the outer portion thereof with a cover flange 31, formed with a bolt hole to fix the cover part 29 to the vehicle body, thereby firmly supporting the cover part 29 to the vehicle body.

Radial bearings 33 and thrust bearings 35 are mounted at both ends of the worm gear 13.

The motor 15 is integrally formed with a primary flange 37 and secondary flange 39. The primary flange 37 forms a vertical surface about the rotational axis of the motor 15 and contacts the coupling block part 27 while the secondary flange 39 forms a horizontal surface about the rotational axis of the motor 15 and contacts the coupling block part 27.

The motor 15 and housing 17 can firmly couple each other via the primary flange 37 and secondary flange 39.

The controller 19 is previously saved with data pertaining to proper rotational states of the motor 15 in response to the vehicle speed and steering angle. Therefore, the controller 19 can promptly adjust the rotational state of the motor 15 according to signals inputted from sensors during the vehicle operation.

Provided that the controller 19 determines that the rotational state of the motor 15 should be changed due to signals of the vehicle speed and steering angle inputted from the sensors, then a certain amount of power is provided to the motor 19 to rotate the motor 19.

The rotational force of the motor 15 turns the worm gear 13, and as the worm gear 13 turns in the cover part 29 of the housing 17, the worm sector gear 11 pivots.

The rotational axis of the worm gear 13 and pivotal axis of the worm sector gear 11 are aligned perpendicular to each other.

As the worm sector gear 11 is integrally installed on the transfer rod 9, when the worm sector gear 11 pivots, the transfer rod 9 as well as the pivot arm 7 of the transfer rod 9 shift, accordingly.

If the pivot arm 7 pivots, the lower control arm 5 linearly moves in the widthwise direction of the vehicle body and the carrier 3 pivots in relation to the steering axis thereof, resulting in a variation of the toe angle of the vehicle wheel 1.

In case the lower control arm 5 receives an exterior force via the vehicle wheel 1 and is about to pivot the transfer rod 9 thereby, the transfer rod 9 is restrained in the pivot via its unique characteristic (no inverse-transfer power) of the worm gear 13 and worm sector gear 11. In short, the vehicle wheel is precluded from pivoting in response to the exterior force, improving the vehicle stability.

The toe angle of the vehicle wheel 1 can continuously be varied according to the determination of the controller 19 while the vehicle is in motion.

As apparent from the foregoing, there is an advantage in that the power transfer system is constituted under a simple construction—a worm gear, transfer rod integrally installed with a worm sector gear, and lower control arm—thereby improving the efficiency of the power transfer of the toe-angle controlling mechanism for vehicle wheels.

There is another advantage in that the worm gear and worm sector gear are sealed in a cover part of a housing, acquiring the durability and reliability of the toe-angle controlling mechanism for the vehicle wheels.

There is further another advantage in that the toe angle is not varied according to the exterior force transmitted from the vehicle wheel, by the characteristic (no inverse-transfer power) of the worm gear and worm sector gear, thus improving the vehicle stability.

What is claimed:

1. A mechanism for controlling toe angle of a vehicle wheel, the mechanism comprising:
    a lower control arm pivotably connected at one end thereof to a carrier supporting a vehicle wheel;
    a transfer rod provided with pivot arms pivotably connected to the other end of said lower control arm;
    a worm sector gear integrally installed on said transfer rod;
    a worm gear meshing with said worm sector gear;
    a motor providing a rotational force to said worm gear;
    a housing fixed at one end thereof to said motor and enclosing said worm gear and said worm sector gear therein; and
    a controller controlling said motor by receiving signals of vehicle speed and steering angle wherein when said worm gear rotates said transfer rod, said lower control arm moves linearly to pivot said carrier to change the toe angle of the vehicle wheel.

2. The mechanism as defined in claim 1, wherein said lower control arm is lengthily installed in the widthwise direction of the vehicle, and one end of said lower control arm is eccentrically connected to said carrier in relation to the steering axis of said carrier.

3. The mechanism as defined in claim 1, wherein said lower control arm comprises:
    an arm end connected to said carrier and provided with a male screw;
    an arm rod provided with a female screw that fastens with said arm end; and
    a locknut coupling to said male screw of said arm end.

4. The mechanism as defined in claim 1, wherein said housing comprises:
    a coupling block part having a vertical surface in relation to a rotational axis of said motor and being penetrated by the rotational axis of said motor; and
    a cover part integrally extending from said coupling block part and stably supporting a meshed state of said worm gear and said worm sector gear therein.

5. The mechanism as defined in claim 4, wherein radial bearings and thrust bearings are provided at both ends of said worm gear.

6. The mechanism as defined in claim 4, wherein said motor is integrally formed with a primary flange forming a vertical surface about the rotational axis of said motor and contacting said coupling block part, and with a secondary flange forming a horizontal surface about the rotational axis of said motor and contacting said coupling block part.

7. The mechanism as defined in claim 4, wherein an inner side of said cover part is provided with a space having a cross-section of an inverse-triangular shape configuration, and said worm sector gear is shaped of an arch or arc.

8. The mechanism as defined in claim 4, wherein said cover part integrally protrudes out at an outer portion thereof with a cover flange, provided with a bolt hole to fix said cover part to a vehicle body.

* * * * *